United States Patent [19]
Peters

[11] Patent Number: 5,276,873
[45] Date of Patent: Jan. 4, 1994

[54] APPARATUS AND METHOD FOR GENERATING CAPTURE COMMANDS FOR DATA ACQUISITION

[75] Inventor: Richard A. Peters, Los Angeles, Calif.

[73] Assignee: Hughes Aircraft Company, Los Angeles, Calif.

[21] Appl. No.: 798,861

[22] Filed: Nov. 22, 1991

Related U.S. Application Data

[63] Continuation of Ser. No. 663,278, Feb. 28, 1991, abandoned, which is a continuation of Ser. No. 288,547, Dec. 22, 1988, abandoned.

[51] Int. Cl.⁵ ............................................. G06F 7/06
[52] U.S. Cl. ................. 395/600; 364/DIG. 2; 364/962.3
[58] Field of Search ............... 395/600, 800, 375, 400, 395/425, 650, 775; 364/DIG. 1; DIG. 2

[56] References Cited

U.S. PATENT DOCUMENTS

| | | | |
|---|---|---|---|
| 3,931,612 | 1/1976 | Stevens et al. | 395/600 |
| 4,137,562 | 1/1979 | Boeck et al. | 364/200 |
| 4,514,822 | 4/1985 | Schneider et al. | 364/900 |
| 4,589,075 | 5/1986 | Buennagel | 364/492 |
| 4,718,011 | 1/1988 | Patterson, Jr. | 364/422 |
| 4,916,655 | 4/1990 | Ohsone et al. | 395/600 |

Primary Examiner—Robert B. Harrell
Attorney, Agent, or Firm—L. A. Alkov; W. K. Denson-Low

[57] ABSTRACT

Capture commands are generated for a set of data divided into groups where each group is identified by a control word. Typically the data set arrives at the present invention as a serial stream. The control words address registers in a first addressable memory array which contain high addresses to a second addressable memory array. The data words trigger a counter, the counts of which constitute low addresses to the second addressable memory array. The high address and the low address together address registers in the second array which contain capture commands. The capture commands signal other devices to capture the corresponding data out of the data set.

12 Claims, 2 Drawing Sheets

APPARATUS AND METHOD FOR GENERATING CAPTURE COMMANDS FOR DATA ACQUISITION

This is a continuation of application Ser. No. 07/663,278, filed Feb. 28, 1991, now abandoned, which is a continuation of application Ser. No. 07/288,547, filed Dec. 22, 1988, now abandoned.

FIELD OF THE INVENTION

This invention pertains to the field of sorting computer data words and, more particularly, to a high speed serial data acquisition module for sorting a set of data words on the basis of control words occurring in the data set.

BACKGROUND OF THE INVENTION

Testing, evaluation, and diagnostic equipment often produce vast amounts of digital data. The data set is often grouped around control words so that a specific type of data can be identified by its proximity to a control word. In order to sort through these vast amounts of data to select the data desired, data acquisition modules have been developed. Typically, these modules store a control word and a word count in registers. The data arrives serially. Control words in the data stream are compared to the control word register. Data words following each control word are counted. When the control word matches the control word register and the data word count matches the data word register, a capture command is sent to a data storage device indicating that the detected word should be captured and stored.

If words which occur in different locations, as measured by the control words, are to be captured, then additional data acquisition modules are used. Typically, the values in the registers are changed manually. If a large number of different data words occurring in different places in the data stream are to be captured, a similarly large number of data acquisition modules are required. This requires a large amount of hardware, space and expense. If different data words are to be captured for one task than for other tasks, then the values in the acquisition module registers must be changed. This is difficult and time consuming with manually set registers. Resetting the registers becomes increasingly difficult as the number of acquisition modules increases.

SUMMARY OF THE INVENTION

The present invention overcomes the shortcomings of the prior art by using random access memories in a unique architecture. The resulting data acquisition module generates capture commands for a large number of different data words in a serial stream using a minimum of hardware. It is easily reprogrammed to capture different words, so that the same module can be quickly converted for different tasks. Finally, it is constructed of inexpensive components readily available on the market.

The present invention generates capture commands to be applied to a data set in which data words within the set are identified by control words. In one embodiment, the control words activate a high address and the data words activate a low address. The high and low addresses together activate capture commands for all data which is to be captured.

In another embodiment the data set arrives at the data acquisition module of the present invention as a serial stream. The control words address registers stored in an addressable memory array. When data is to be captured, the value stored in the addressed register corresponds to a high address to a second addressable memory array. The data words following each control word are counted as they arrive and the count constitutes a low address to the second addressable memory array. The high and low address are combined and address registers in the second memory array. The values stored in the addressable registers in the second array constitute the capture commands.

DETAILED DESCRIPTION OF THE INVENTION

Figure 1:
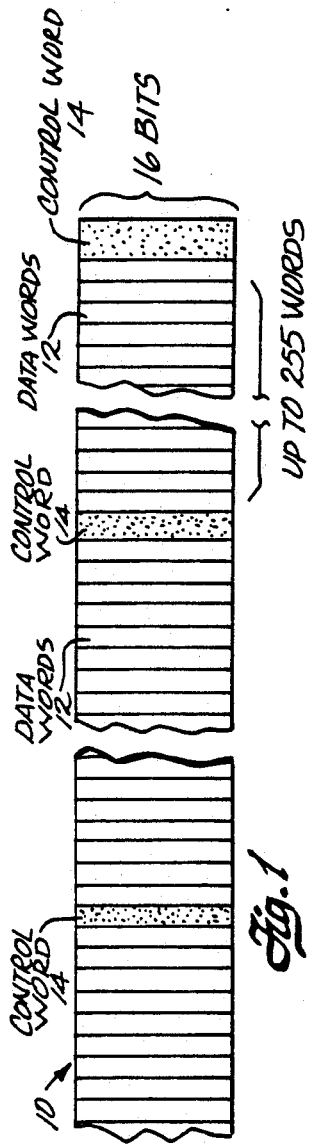
FIG. 1 is a diagram indicating the structure of a data set for use with the present invention.

FIG. 1 represents the basic format of an exemplary data set from which the present invention is adapted to selectively capture data. The data set 10 is grouped into blocks of data words 12 each identified by a control word 14. In this example, each block may have as many as 255 data words and all words are sixteen bits long. However, it is not necessary that every block have 255 words or that all sixteen bits be used in each data word. The data words come from a variety of sources and represent different information. Normally the data arrives in a serial stream of words from different senders. For example, if the data set was from a stress analysis, the data words may represent a variety of strain gauge measurements from different locations, the time of the measurements and the stress applied. However, data from any source or sources can be arranged as a set in the format shown in FIG. 1. The data may be arranged sequentially and sorted in real time or it may be static, stored in memory.

The control words 14 carry no data from the test. They serve only to identify the data words. Each block of data words is grouped in a predefined order following its identifying control word so that, for example, data from strain gauge six would always be in the sixth data word after control word three. If only data from strain gauge six is desired, then one need capture only the sixth data word following control word three.

In testing a complex system, a vast amount of data may be produced. From that data, it may be necessary to evaluate and analyze only a few hundred different types of data. The exemplary embodiment of the present invention described below is adapted to work with a data stream having a structure similar to that depicted in FIG. 1. The data stream format of FIG. 1 using sixteen bit words can accommodate 65,536 control words with up to 255 data words following each control word. This represents more than sixteen million different identifiable pieces of data. The exemplary embodiment can select up to 255 of these 65,536 control words and can select any of the 255 data words from a block which follows a chosen control word. If more or fewer control words are to be selected or if the data set differs from that of FIG. 1, the present invention can readily be adapted to suit.

Figure 2:
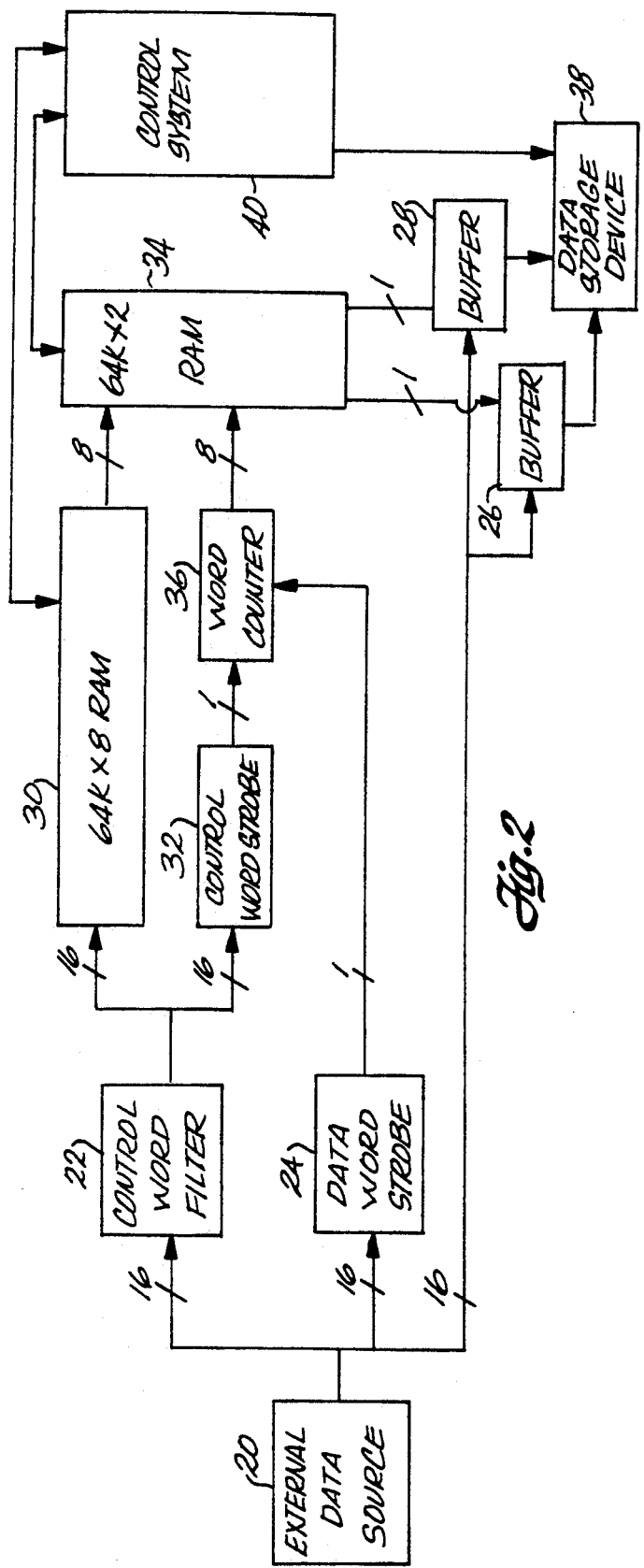
FIG. 2 is a block diagram using tables to show an exemplary embodiment of the present invention.

FIG. 2 is a block diagram of an exemplary embodiment of the present invention and associated components. A serial data stream containing data words and control words is generated from external components which are collectively labeled external data source 20.

Incoming data from the external data source 20 arrives serially word by word and is transmitted to a data word filter 22, a word strobe 24 and two data storage buffers 26, 28. In this exemplary embodiment, the sixteen bit data and control words are transmitted in parallel on sixteen bit lines to all four of these components. The data word filter 22 transmits control words to a first random access memory (RAM) 30 and to a control word strobe 32. Again, this is done on sixteen bit parallel lines. The first RAM 30 sends signals on an eight bit parallel line to a second RAM 34. The second RAM 34 sends one bit capture command signals to data storage buffers 26, 28. The word strobe 24 sends signals on a one bit line to a word counter 36. The word counter 36, in turn, sends its count on an eight bit parallel line to the second RAM 34.

The data storage buffers 26, 28 connect to a data storage device 38, such as a disk drive or a memory array. Captured data is stored there for later processing. Alternatively, the buffers could connect directly to data processing equipment and not be stored. Finally, a control system 40 is coupled to the first RAM 30 and the second RAM 32. The control system 40 determines the values which are to be stored in the first and second RAMS, 30, 34 and load those values into the RAMS when the system is initialized using techniques well known in the art. The control system 40 may be a simple state machine or a general purpose computer. It is preferred that the control system 40 be a general purpose computer which is also connected to the storage device 38 so that it can process the captured data. Alternatively, the RAMS 30, 34 could be nonvolatile or hard wired and the control system 40 would not be necessary.

The operation of the module is best explained using the specific example of FIG. 3 as is done below. However, in general for this exemplary embodiment, a serial stream of data words is transmitted to the data word filter 22, the word strobe 24 and the storage buffers 26, 28. The data word filter 22 filters out data words so that only control words are transmitted to the first RAM 30 and the control word strobe 32. This can be done in a variety of ways well known in the art. For example, one bit of each sixteen bit word may be dedicated to indicating whether the word is a control word or not leaving the other fifteen bits for data. Whenever this one bit is detected, the word filter 22 transmits the corresponding word to the first RAM 30 and the control word strobe 32. Alternatively, control words could be identified by coded bit patterns or by their location in the data stream.

The first RAM 30 is a sixty-four kilobyte by eight bit array, or in other words, the first RAM contains 65,536 memory locations of eight bits each. Each control word is a sixteen bit address to one of the eight bit locations. That is, for every possible sixteen bit control word, there is an eight bit location in the first RAM 30. The eight bit locations are loaded by the control system 40, when the system is initialized. The values stored in each location constitute addresses which point to blocks in the second RAM 34. Since there must be substantially fewer outgoing eight bit pointing addresses than there are incoming sixteen bit control word addresses, most of the eight bit locations will be set to zero. A zero value in an eight bit location points to the first block in the second RAM 34 the contents of which is all zeros, indicating that none of the data words following the corresponding control word ought to be selected.

When the first RAM 30 is addressed, the corresponding eight bit pointer stored in the addressed location is transmitted to the second RAM 34, a sixty-four kilobyte by two bit array. Each eight bit pointer stored in the first RAM constitutes the most significant eight bits of a sixteen bit address to the second RAM 34. The less significant eight bits which make up the rest of the address to the second RAM 34 come from the word counter 36. The word counter 36 receives a count pulse from the word strobe 24, every time a new word is detected in the data stream. The word counter counts the number of pulses and transmits each new count to the second RAM 34 as the lower eight bits of an address. The word counter is also connected to the control word strobe 32. The control word strobe sends a reset signal to the word counter 36 every time a control word occurs in the data stream. The reset signal zeroes the counter. As a result, the word counter 36 starts counting again from zero when each control word is detected. The eight bit lower address transmitted by the word counter 36 therefore corresponds to the number of places by which each data word follows the preceding control word. The first data word corresponds to a count of one, the second word to a count of two, etc., up to 255.

In brief, each eight bit pointer from the first RAM 30 points to a block of 255 two bit locations in the second RAM 34. In the second RAM 34, each two bit addressable memory location, which is addressed by the eight bit address from the first RAM 30 together with the eight bit count from the word counter 36, has two one bit capture command registers. The capture commands instruct the data storage buffers either to capture a word and send it to the data storage device or not, depending upon whether a capture bit has been stored in the corresponding location. For example, if a one is stored in the first bit of a capture command location and a zero is stored in the second bit of the same capture command location, then the first data buffer 26 captures the corresponding data word and the second data buffer 28 does not. The number of capture command registers for each address can be varied to suit the number of data buffers. Two buffers are shown to exemplify how two different sets of data may be captured simultaneously from the subject data stream. However, more or less buffers may be provided to support the acquisition of different sets of data.

Figure 3:
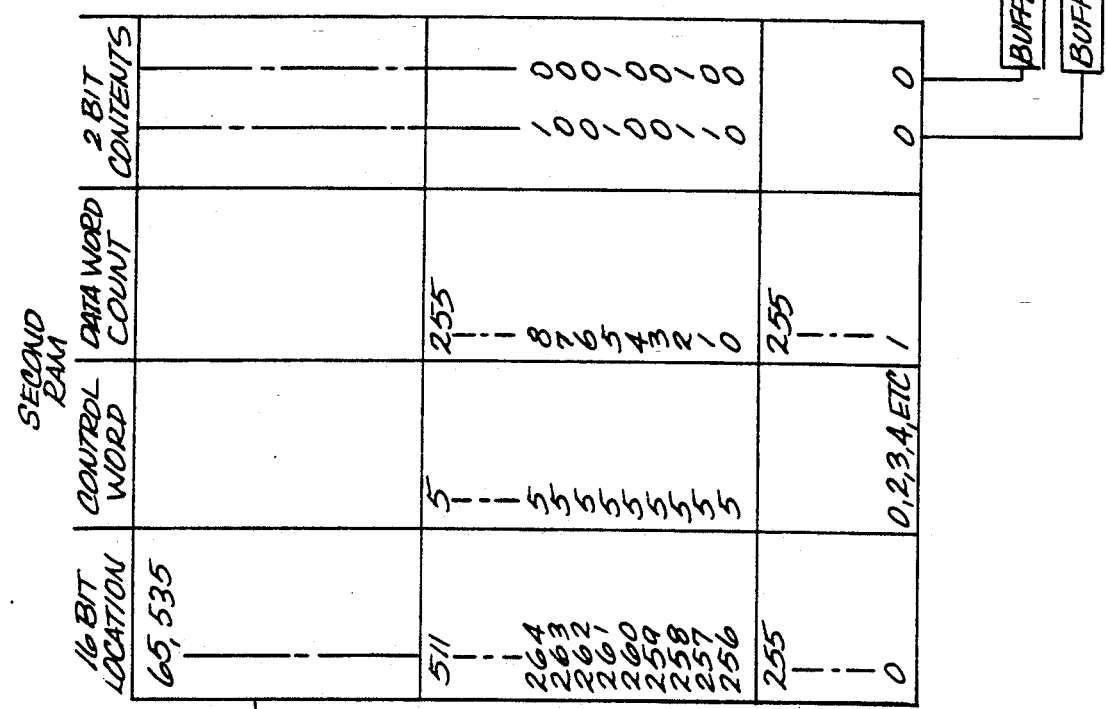
FIG. 3 is a block diagram showing an exemplary configuration for the memories of the present invention.
Figure 3:
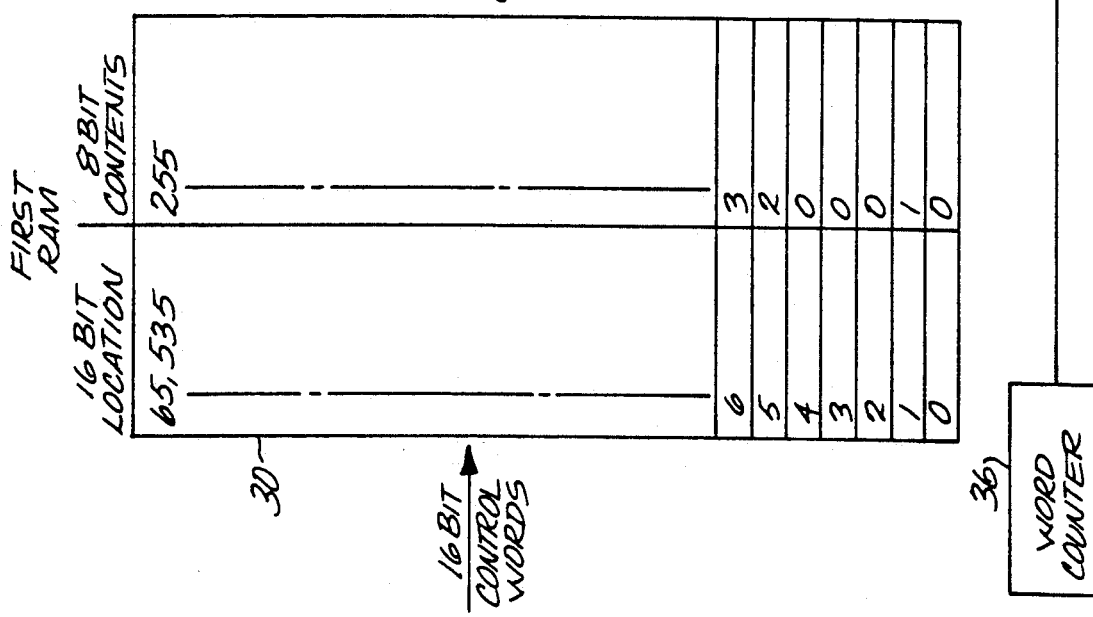

Referring to FIG. 3, consider the following example. Suppose part of the capture criteria is that the first, second, fifth and eighth data words following control word five are to be captured by the first data buffer 26, and that the second and fifth data words following control word five are to be captured by the second data buffer 28. FIG. 3 is a table showing a configuration for the first and second RAM which would achieve this.

In the first RAM 30, location five contains the value "two" in binary form (indicated in decimal form in FIG. 3). Location five will be addressed directly by control word five whenever it occurs. "Two" is transmitted as an upper address, to the second RAM 34 where it points to, in this case, the second block of 256 locations, locations 256–511. In order to select individual locations from the second block of 256 locations, a lower address is required. The lower address comes from the word counter 36 and is simply the count of the corresponding data word. The counter is reset by the word strobe 24, each time a control word occurs. Therefore, the first word following each control word causes the word counter to send a binary "one" on its eight bit lower address line. The lower address "one" together with the upper address "two" directly accesses location 257.

As the chart indicates, location 257 corresponds, in this example, to control word five, data word one and contains a positive one bit capture command for the first buffer 26, but a null bit capture command for the second buffer 28. Therefore, the first data word following control word five is captured by the first buffer 26, but not the second buffer 28. As shown in the table for the second RAM 34, FIG. 3, the third, fourth, sixth, and seventh data words are not captured, because the capture commands in locations 259, 260, 262, 263 and 264 are zeros. Location 256 corresponds to control word five. Since the control word is not to be captured, it contains zeros as well. The register for the fifth word, register 261, contains capture commands for both buffers so that it, like the second word, is captured by both buffers. Data word eight triggers register 264, so it is captured only by the first buffer 26. Thus, the configuration of the first and second RAMs 30, 34 implements the capture criteria set forth above. Of course, many other configurations implementing the same or other capture criteria are possible.

Capture commands for the remaining data words following control word five are stored in the second block of locations, locations 256 to 511, in the second RAM 34 in the same way. The first block of locations, locations 0 to 255, in the second RAM 34 is reserved for all control words from which data words are not to be selected. In other words, all control words from which data is not to be captured address locations in the first RAM 30 which point to the first block of 256 locations. In the table of FIG. 3 these control words are control words 0, 2, 3 and 4. Capture commands for data words which are to be captured but which follow control words are mapped onto other blocks of 256 registers in the second RAM 34.

The present invention is much more useful when a large number of data words are to be selected from a still larger number of possibilities. Using a sixty-four kilobyte by eight bit array for the first RAM 30 and a sixty-four kilobyte by two bit array for the second RAM 34, the exemplary embodiment can select any of the 255 data words which follow up to 255 different control words in a system containing up to 65,536 different control words.

The system can also be programmed by the control system 40 to capture data words from more than 255 control words by mapping two control words onto the same eight bit pointer or upper address. Since the first RAM 30 simply maps sixteen bit control words onto eight bit pointers to blocks of locations in the second RAM 34, it is possible to map more than one control word onto the same block of locations.

For example, assume the capture criteria used in the example of FIG. 3, also requires that the first, second, fifth and eighth word following control word 180 be captured. Then, in order to also include these data words following the 180th control word in the capture criteria, one simply writes the same upper address, "two," onto both the fifth and 180th addressable location in the first RAM 34. The same capture commands in the second RAM 34 are now used both for data words following the fifth control word and for data words following the 180th control word. If the control words are needed to distinguish the data, one may make the second RAM 34 larger to accommodate more capture commands instead of using the double mapping described above. The details of the exemplary embodiment can be easily modified to select more or fewer data words or to accommodate different types of data streams.

In addition, the present invention may be adapted to accommodate different buffer and data storage arrangements. The exemplary embodiment uses two capture commands in the second RAM 34. This allows a different capture command signal to be sent to each of two buffers. Two buffers were chosen for the exemplary embodiment, so that two different sets of data could be captured from a single subject data stream. By increasing or decreasing the number of bits in the registers of the second RAM 34, the number of buffers can also be increased or decreased. The buffers may also be arranged so that different buffers capture data for different data storage devices. One pair of buffers could capture data for a disk drive, a second pair could capture data for immediate analysis, and a third could capture data for a display. Data may also be captured and sorted into different storage devices.

The invention may also be implemented without using RAMs. Any device which produces one digital signal in response to a different digital signal may be used. RAMs were chosen for their simplicity, speed, cost, and programmability.

As explained above, the values stored in the first and second RAMs completely determine which data words are to be captured and which buffer shall capture them. In other words, these registers reflect the capture criteria. The values in the first and second RAM are, however, easily changed. The control system 40 can write new values into the first and second RAMs at any time whenever a different capture criterion is desired. The control system 40 can be a computer, a simple processor, or even manually set switches. The use of these devices to set values in RAM registers is well known.

Flexibility is enhanced when the computer that analyzes the captured data, is the same computer that controls the settings of the first and second RAM. A single computer may then be programmed to perform two different tasks in sequence, even if the two tasks require different capture criteria. The computer performs the first task using one setting for the first and second RAMs, then resets the RAMs and performs the second task using different settings for the first and second RAMs.

The present invention is particularly well suited to acquiring data from aircraft and missile tests for troubleshooting and maintenance. However, it can be applied anywhere that a large number of different data words are to be selected from a still larger palette of data words.

It is not intended by showing only one embodiment of the present invention to limit the claims to that one embodiment. It should be understood that a large variety of variations and modifications of the exemplary embodiment can be performed without departing from the spirit and scope of the present invention.

What is claimed is:

1. An apparatus for generating capture commands to be applied to a data set, the data set supplied by an external source having groups of data words identified by control words interspersed within the data set, the apparatus comprising:

means for detecting said control words in the data set and generating a high address based upon said control words which identify a group of data arranged in a predefined order from which data is to be captured;

means for detecting said data words in the data set and generating a low address in response to said data words which are to be captured; and an addressable memory for generating a capture command based upon the high address and the low address in combination, the addressable memory storing at least one capture command at each location identifiable by a combination of said high address and said low address, the capture command indicating that the data words corresponding to the high and low address combination are to be captured.

2. The apparatus of claim 1 in which the capture commands, the low addresses and the high addresses are programmable.

3. The apparatus of claim 1 in which the high address and the low address comprise more bits than any capture command.

4. An apparatus for generating capature commands to be applied to a data set supplied by an external source, the data set having groups of words identified by control words interspersed within the data set, the apparatus comprising:

means for detecting said control words in the data set and generating a high address in response to control words which identify a group of data arranged in a predefined order from which the data is to be captured;

means for detecting data words in the data set;

a word counter for generating a low address resulting from signals from the means for detecting data words, the word counter changing the low address for each detected data word;

means for detecting said control words in the data set and resetting the word counter when one of said control words is detected; and means for generating a capture command resulting from the high address and the low address in combination to indicate that the corresponding data words are to be captured.

5. An apparatus for generating capture commands to be applied to a data set, the data set supplied by an external data source (20) having groups of data words identified by control words, the apparatus comprising:

a data word filter (22) which receives data from the external source (20) and filters out said data words so that only said control words are transmitted, and transmits said control words;

a word strobe (24) which receives data from the external source (20);

data storage buffers (26,28) for storing captured data which receives said data from the external data source (20);

a first random access memory (30) which receives the control words from the data word filter (22) in which high addresses are stored at locations, which locations are addressed by control words in the data set;

a control word strobe (32) which receives the data words and the control words from the data word filter (22);

a word counter (36) which receives a count pulse signal from said word strobe (24), for generating a low address corresponding to a count of the data words identified by one of said control words, and which sends a count to random access memory (34);

means for detecting said control words in the data set and resetting the word counter (36) when one of said control words is detected;

a second random access memory (34) which receives signals from said first random access memory (30), in which capture commands are stored in locations addressed by combinations of the high addresses and the low addresses and which sends one bit capture command signals to said data storage buffers (26,28); and means for supplying said capture commands from the second random access memory (34) in response to high and low address combinations.

6. The apparatus of claim 5 in which the high addresses can be changed to suit different capture criteria.

7. The apparatus of claim 5 in which the capture commands, the low addresses and the high addresses can be changed to suit different capture criteria.

8. A method for generating capture commands to be applied to a data set, the data set supplied by any external source having groups of data words identified by control words interspersed within the data set, the method comprising machine executed steps of;

first, detecting said control words in the data set and generating a high address based upon control words which identify a group of data arranged in a predefined order from which data is to be captured;

second, detecting data words in the data set and generating a low address in response to data words which are to be captured and;

third, applying the high and the low address in combination as addresses to an addressable memory to generate a capture command resulting from the high address and the low address in combination to indicate that the corresponding data words are to be captured.

9. The method of claim 8 wherein the step of generating a low address comprises generating a count of a number of data words following each control words.

10. The method of claim 8 comprising detecting control words in the data set and resetting a data word count in response thereto.

11. The method of claim 8 comprising programming a set of capture commands into the addressable memory.

12. The method of claim 8 wherein the step of detecting control words and generating a high address comprises applying control words in the data set as an address to a second addressable memory.

* * * * *